Aug. 4, 1953  G. W. MASON ET AL  2,647,625
DISPENSING DEVICE
Filed April 22, 1950

INVENTORS
George W. Mason.
Bruce G. Gee.
By Frank C. Fearman.
ATTORNEY

Patented Aug. 4, 1953

2,647,625

UNITED STATES PATENT OFFICE 2,647,625

DISPENSING DEVICE

George W. Mason and Bruce D. Gee,
Otisville, Mich.

Application April 22, 1950, Serial No. 157,464

1 Claim. (Cl. 206—53)

This invention relates to dispensing devices for dispensing nylon line, thread and similar material wound on a flanged spool or drum and more particularly to a resilient means adapted to be placed over the wound cord or line, which means extends from flange to flange of the spool on which the product is wound, thus yieldingly holding the material against unwinding and contracting as the body of line diminishes.

One of the prime objects of the invention is to provide a resilient band covering for securing a wound line or thread material on a spool, said means securing the wound nylon line, thread, or similar material on the flanged spool or dispenser on which it is wound, while permitting any desired length or lengths to be uncoiled and severed without releasing or permitting unwinding of the portion still remaining on the spool.

A further object is to provide a resilient band extending from flange to flange of the spool on which the line is wound, with the free end of the line leading between one flange of the spool and the edge of the resilient band or covering to facilitate controlled unwinding of certain lengths when desired, while securing the remaining coiled portion tightly coiled on the spool, with the free end yieldingly held between the edge of the resilient band and one of the flanges of said spool.

A further object still is to provide simple, practical and economical means for securing a relatively stiff line material in coiled position on a spool, both when fully wound or partially dispensed, and which can be of a color to agree with the color of the wound line material, thus providing for quick identification of the color of the fully covered material wound on the spool.

A still further object is to provide simple, economical and effective means for preventing haphazard or accidental unwinding of coiled line from a spool, which means can be easily and quickly placed in position and/or removed.

While some of the more salient features, characteristics and advantages of the instant invention have been above pointed out, other advantages will readily become apparent from the following disclosure taken in conjunction with the accompanying drawing and following description.

Figure 1:
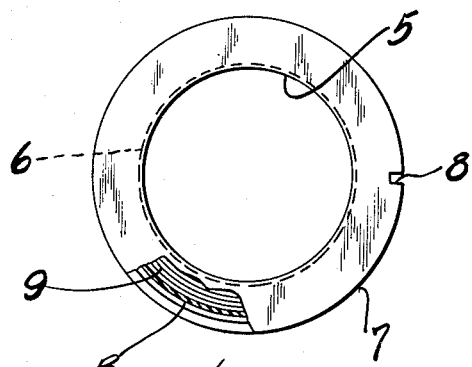
Fig. 1 is a side-elevational view of a spool with the nylon line coiled thereon and our retaining means covering the coiled material.
Figure 2:
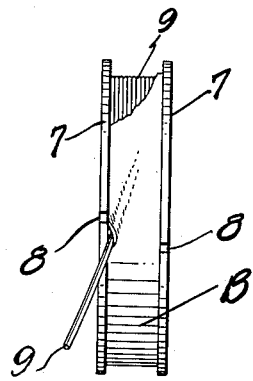
Fig. 2 is an edge-elevational view thereof, the covering being broken away to more clearly illustrate the combination.
Figure 3:
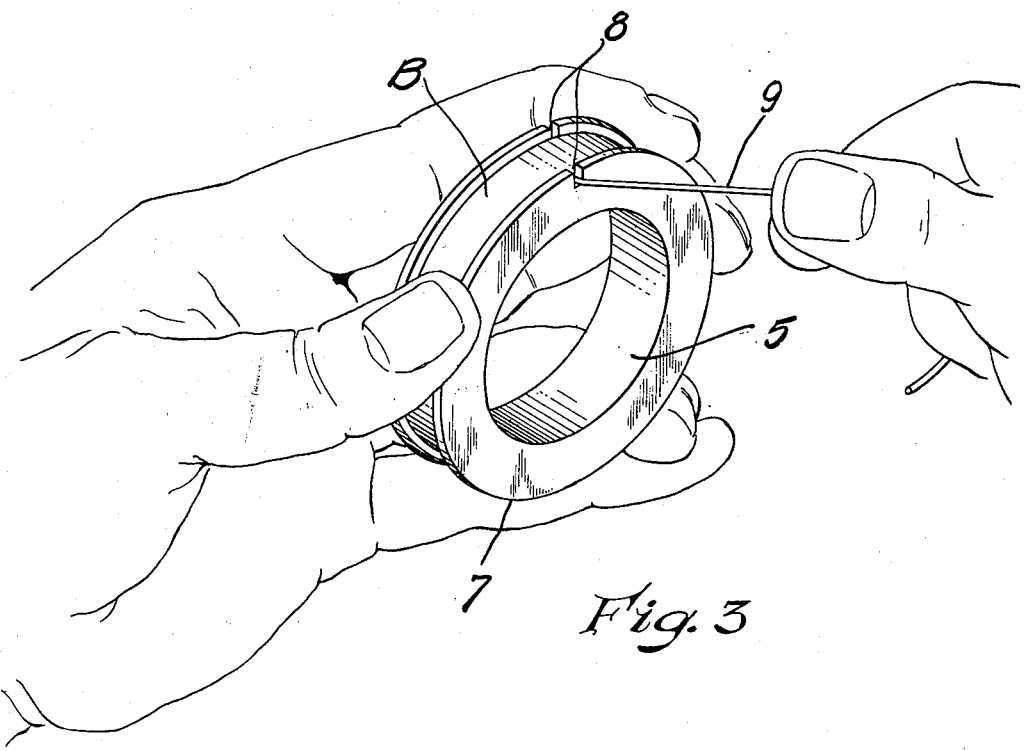
Fig. 3 is a perspective view showing the manner of severing predetermined unwound lengths of the material.

Referring now more specifically to the drawing in which we have shown the preferred embodiment of our invention, the numeral 5 indicates the spool which can be made up of plastic or any other desired material. This is formed with a drum-like section 6, and flanges 7 are provided on the ends of the drum as usual, small notches 8 being provided in the edges of the flanges and for a purpose to be presently described.

Nylon line 9 has an inherent stiffness and a tendency to uncoil when wound on a spool, and quickly becomes loose and entangled when released unless the free end is anchored or otherwise restrained. This nylon line is wound on the drum 7 of the spool in certain predetermined lengths, i. e., the spool is designed to accommodate a certain yardage, and it is wound evenly on the spool from flange to flange, and any desired number of layers of superimposed coils may be accommodated.

After the desired length is wound, a flat, resilient rubber band B is placed over the coiled body and extends from flange to flange of the spool, with the free end of the line projecting or leading between the edge of the band and the one flange as shown, and when it is desired to uncoil or remove a certain length of line from the spool, it is merely necessary to hold the spool in the hand, grasp the free end of the line, and the line can be readily uncoiled, said line rolling from under the band as it is unwound.

When the desired length has been uncoiled, the line is placed in the slit 8 in the edge of one of the flanges; it is then turned to lead in the opposite direction, and a sharp jerk will cleanly sever the desired length, leaving a short free end of the line projecting between the resilient covering and the flange, so that it can be readily grasped for unwinding as occasion demands.

From the foregoing description, it will be obvious that we have perfected a very simple, practical and economical restraining means for securing windable line and thread of all kinds.

What we claim is:

A dispensing spool for nylon fishing line comprising a winding spool formed with flanges on the ends thereof, and on which a line is wound to cover the length of said spool with superimposed layers of a plurality of line coils in side by side relation, and a rubber band of a width equal to the distance between said flanges and covering the top layer of the coils to frictionally hold them in coiled, side-by-side relation, the free end of the line leading between one edge of the rubber band and one of said flanges and being frictionally held by the band to prevent its accidental unwinding but permitting dispensing of the line when the free end of the line is pulled in a direction at an angle to the direction of winding.

GEORGE W. MASON.
BRUCE D. GEE.

References Cited in the file of this patent

UNITED STATES PATENTS

| Number | Name | Date |
|---|---|---|
| 185,864 | McMillan | Jan. 2, 1877 |
| 283,689 | Walker | Aug. 21, 1883 |
| 643,544 | Simmons | Feb. 13, 1900 |
| 1,797,539 | Arthur | Mar. 24, 1931 |
| 2,172,675 | Goldberg | Sept. 12, 1939 |